United States Patent Office 3,069,609
Patented Dec. 18, 1962

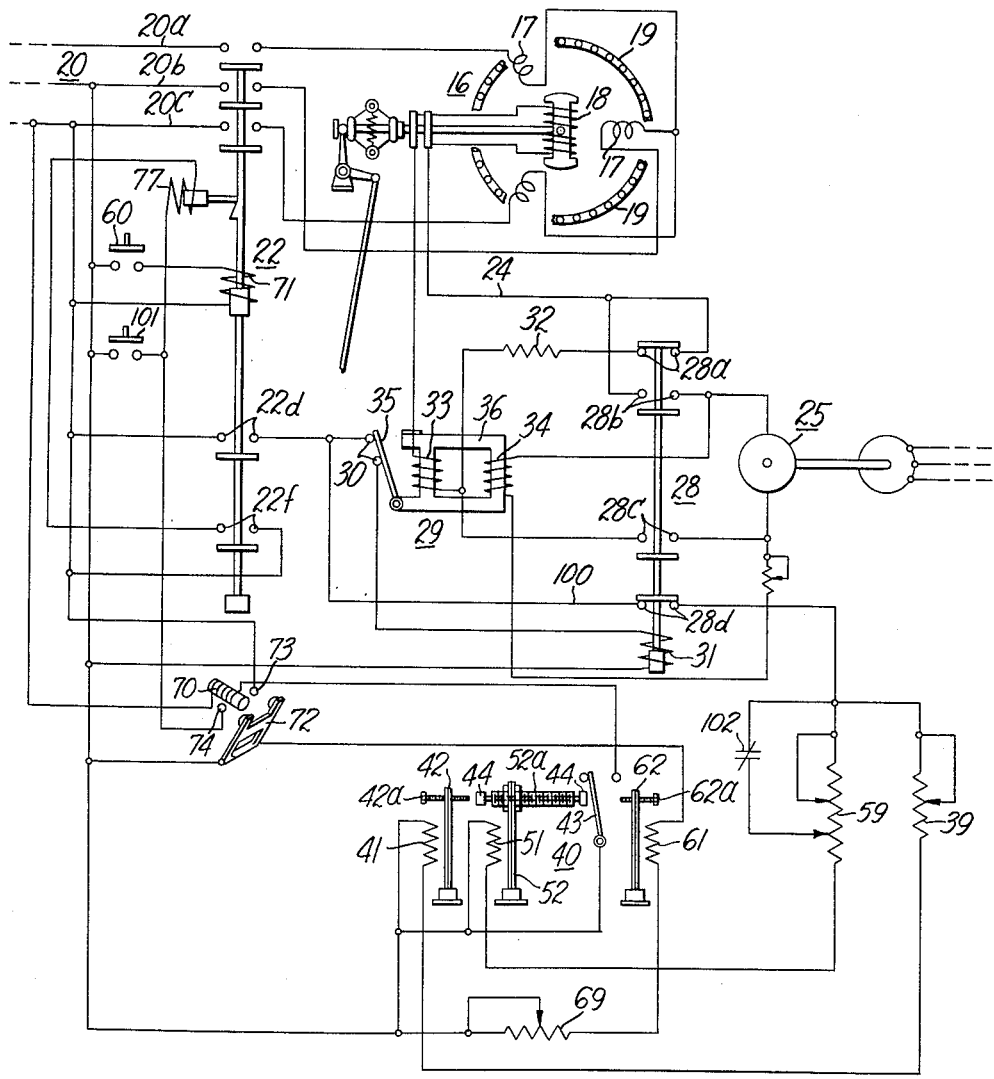

3,069,609
THERMAL RELAY FOR CAGE WINDING PROTECTION OF SYNCHRONOUS MOTORS
Arie P. de Snoo, Waukesha, and Rayfeld J. Maxim, Milwaukee, Wis., assignors to Allis-Chalmers Manufacturing Company, Milwaukee, Wis.
Filed Nov. 3, 1959, Ser. No. 850,636
2 Claims. (Cl. 318—170)

This invention relates generally to control arrangements and devices for electrical equipment. More particularly, this invention relates to control devices for protecting a secondary winding of an alternating current motor from being overheated by the current induced therein when the motor is in locked rotor condition or is operating subsynchronously.

When a motor is disconnected in order to protect it from overheating due to operating for a certain period at locked rotor condition or subsynchronously, the time it takes the motor to cool is not the same as the amount of time it took to heat the motor. Consequently, when the motor is operating subsynchronously a different period of time should elapse for timely disconnection than for timely reconnection of the motor. The prior art teaches thermorelays in control systems for providing different time delays which are successive and different in length for disconnecting and restarting motors. But these control systems have relays, which usually employ bimetallic elements as contacts and have relied on the same bimetallic element for both connecting and cutting off the circuit connected to a motor. These relays have the following disadvantages:

(1) They tend to be sensitive and therefore they have on several occasions shut down the motor when there was no justification therefor.

(2) They do not have practical means for adjusting the tripping time delay independently from the reset time delay. The tripping time delay is the delay produced from the point of time where a motor starts being overheated at subsynchronous speeds to motor cutoff; and the reset time delay is the period of time that elapses after tripping off the motor to when reconnection of the motor is desirable.

(3) The length of time that elapses between the point of time where the motor is disconnected and reconnected is dependent on the deflection of a bimetallic element while it is being cooled. Since the deflection is dependent on the ambient temperature losses when a bimetal is being cooled, it is hard to accurately predict how long it will take the bimetal to reconnect the motor.

In order to overcome the disadvantages of control systems containing the relays mentioned above, a new and improved control system and thermorelay is provided wherein the relay comprises separate bimetals for tripping and resetting, these bimetals operating independently of each other.

It is, therefore, one object of this invention to provide a new and improved thermorelay.

Another object of this invention is to provide a new control system which disconnects a load device from a source of power in case abnormal conditions exist.

A further object of this invention is to provide a new and improved control arrangement for an alternating current synchronous motor in which the motor is deenergized in the event that the motor does not accelerate to synchronous speed within a predetermined time after starting or after slipping out of synchronism.

Another object of this invention is to provide a new and improved control arrangement for starting a synchronous motor in which the motor is precluded from being restarted until its cage windings have cooled for a predetermined time.

Also, it is an object of this invention to provide a new and improved time delay device for starting a synchronous motor in which the predetermined time that is used to determine when to trip the motor off its circuit, if it is operating subsynchronously, can be adjusted independently from the time lapse provided for reconnection of the motor.

Still another object is to provide an improved thermorelay that has two successive independent time delays wherein a circuit is opened when the first time delay elapses and is closed when the second time delay elapses.

Still another object is to provide a thermorelay which has bimetals that disconnect and reconnect a motor by actuating a switch.

Objects and advantages other than those set forth will be apparent from the following description when read in connection with the accompanying drawing in which:

There is a diagrammatic view of a synchronous motor and a thermorelay device therefor embodying the present invention.

Referring more in particular to the drawing by characters of reference, it illustrates a load device such as a synchronous motor 16 having an armature or primary winding 17, a field or secondary winding 18 and another secondary or squirrel cage winding 19. The synchronous motor 16 is connected to a suitable source of A.C. current 20, indicated by conductors 20a, 20b, and 20c through a starting breaker 22. An exciter 25 is provided for exciting the field winding 18 and may be driven from synchronous motor 16 or may be driven, as shown, by a separate motor. The field winding 18 is connected to and disconnected from the exciter 25 by means of contact 28b and 28c of the field contactor or breaker 28. Contactor 28 is controlled by means of a field application relay 29, which has contacts 30 in circuit with a coil 31 of the contactor 28. When current flows through coil 31 the exciter is then connected to the field winding 18 through the closing of contacts 28b and 28c.

Field application relay 29 is a simple, rugged device operable to close contacts 30 after acceleration of motor 16, when the frequency and magnitude of the induced current in field winding 18 have diminished to the desired values. The frequency and magnitude of the current in field winding 18 is inversely proportional to the speed of the motor and is directly proportional to that of the case windings 19. In this arrangement the field winding 18 is connected in series to a coil 33, a field discharge resistor 32 in a circuit 24 by a normally closed contact 28a of a field contactor or breaker 28. It is this coil 33 which generates a flux in the core 36 of field relay 29 which influences armature 35 according to the induced current and frequency in field winding 18. A coil 34, which is wound around a part of the core 36 of relay 29 is connected in series to the exciter 25. By reason of the energization of coil 34 from the substantially constant voltage direct current furnished by the exciter 25, the coil 34 provides a substantially constant flux component in one direction through the core 36 of relay 29. Armature 35 is operatively responsive to the sum of the fluxes produced in the core 36 by coils 33 and 34. Therefore, when the induced current in field winding 18 diminishes to a low level the flux produced by coil 33 also reduces and the flux from coil 34 predominates and causes armature 35 to close. A detailed description of this particular field application relay may be found in United States Patent 2,478,693, William J. Herziger, dated August 9, 1949.

For protecting the synchronous motor 16 from overheating during times of excessive starting duty, a new and improved relay 40 is provided. This relay has other applications but is particularly useful for protecting the starting or cage windings of a dynamoelectric machine from overheating due to unsuccessful starts and/or too frequent starts. Relay 40 can be adjusted to trip the motor 16 off its circuit and deenergize it when the length of time between starting of the motor and before reaching synchronism is slightly less than the time it would take the motor's cage windings to burn out at the motor's worst slip condition. The relay 40 will also operate in this control system when the motor falls out of synchronism. Upon falling out of synchronism, field application relay 29 attracts armature 30 thereby energizing the thermorelay 40. More of this circuit will be discussed later. This relay also prevents the motor from being reconnected until a time elapses that would be sufficient to cool the motor to a point where it can be safely restarted.

The relay comprises a switch such as the microswitch 43 having a first and a second position, means for moving the microswitch to its second or closed position after a predetermined time and a thermally responsive reset element 62 positioned to move the microswitch to its first or open position after a predetermined time from when the switch was closed. The means for closing the switch after a predetermined time is preferably a heat responsive element such as the illustrated bimetallic element 52, which cooperates with a slider 44.

The first tripping element 52 can be heated by a current circulating through the first tripping heater 51. Upon being heated for a selected predetermined time, it deflects to trip the motor off its circuit by causing slider 44 to trip microswitch 43 to its closed position. The slider 44 is slidably disposed in an axially hollow screw 52a, the slider being exposed at both ends of the screw and having heads at both ends to prevent it from being pushed out of the screw's hollow cavity. The control circuit that is associated with microswitch 43 to trip the motor off will be discussed hereafter. The screw 52a is attached to first tripping element 52 and can be adjusted to vary the length of time it takes the element to close the microswitch 43. This adjustment is made to provide the time delay required for tripping the motor off its circuit after it has absorbed the severest amount of heat that it can absorb without being damaged.

A second tripping element 42 may be provided. Such an element is known as an incomplete sequence protection element and is provided to complement the operation of the first tripping element. This element takes a longer time to deflect than does element 52 and it causes the slider 44 to move toward the microswitch and close it if the first tripping element has not as yet acted due to any defect in the circuit of tripping heater 51. Element 52 has an adjustable contact 42a for varying the length of time it takes the element to actuate slider 44 in order to close microswitch 43. Due to slider 44 being disposed in the hollow cavity of contact screw 52a the tripping time of element 52 can not only be adjusted independently of that element 42 but also it can close the microswitch 43 independently of element 52. However, usually when the first tripping element 52 is caused to deflect toward the microswitch 43, the adjustable screw contact 52a pushes slider 44 toward the microswitch and trips microswitch 43 to its closed position, thereby cutting off the motor.

Upon motor cutoff, current flows through a reset heater 61 and heats the reset bimetallic element 62 until it deflects far enough to enable its adjustable contact 62a to press against microswitch 43 thereby causing it to close. The length of travel of this bimetal 62 can also be adjusted to vary the time delay and hence cause the switch 43 to be actuated after a selected predetermined time elapses.

If it is desired to control the current flow in first tripping heater 52, a zero speed switch 102 may be operatively attached to the motor rotor. The switch normally is open. However, it is closed when the motor is running at speeds less than ten percent of synchronous speed. At these low speeds the current which normally circulates through resistor 59 is shunted around most of resistance 59 and the current flow in heater 51 is increased. This increase in current heats up element 52 quickly. When the motor goes faster than ten percent of synchronous speed, the zero speed switch opens and no longer shunts current around resistor 59. Due to the increase in resistance in the overall circuit, less current flows through heater 51. Hence, the first tripping element 52 is heated more slowly when the zero speed switch is open. The zero speed switch causes the motor to be tripped off faster at these low speeds because the motor draws more current and hence heats up and burns out much faster at low speeds.

In this embodiment of the invention the control relay 40 is energized upon the closing of the starter breaker 22 which also functions as a running breaker. The operation of this control system is as follows:

Upon closing a starting push button switch 60, current flows from conductor 20b through the push button switch 60 and closing coil 71 of breaker 22 to conductor 20c. Circuit breaker 22 closes and causes energization of the stator winding 17 of the synchronous motor 16. Current flowing through the stator winding 17 induces current in cage winding 19 and field winding 18 and tends to cause the motor rotor to rotate.

The induced current in the field winding 18 circulates through the contacts 28a of the field contactor 28, and the discharge resistor 32 and coil 33 of field application relay 29. The armature 35 of the field application relay 29 is attracted to the relay's iron core and by its movement opens contacts 30, and the contacts 30 remain open until the frequency and magnitude of the induced current in the field winding circuit has decreased to a predetermined value.

Under this operating condition current heats the first and second tripping elements 52 and 42 by circulating through their respective heating elements 51 and 41. When the current is heating tripping element 52, the circuit is from source 20b through tripping heater 51, variable resistor 59, contacts 28d, conductor 100, contacts 22d, back to source 20c.

As mentioned before, zero speed switch 102 increases the amount of current flowing through heater 51 at low speeds of the motor in order to cause the tripping element to deflect faster. It should be understood that the current for energizing heater 51 could be a varying current which simulates the magnitude of the current induced in the case windings 19 or field windings 18.

The circuit which traces current flow when tripping element 42 is being heated is: source 20b, heater 41, resistor 39, contacts 28d, conductor 100, contacts 22d and back to source 20c. As before explained in detail, after the first and second tripping bimetallic elements are heated a predetermined time, the microswitch 43 is moved to its closed position to cut off the motor.

When microswitch 43 has been pushed to its closed position, the motor is deenergized by a breaker opening means, which is preferably, as shown, a tripping coil 77. Current flows from source 20b through microswitch 43, a relay coil 70 and then back to source 20c. Relay coil 70 attracts its armature 72 which closes contacts 73 and 74. Current then flows from source 20b through armature 72, stationary contact 74, tripping coil 77, contacts 22f of breaker 22 and back to source 20c. The tripping coil 77 then strips circuit breaker 22 to deenergize the motor. Current then starts to flow from source 20b to heat the reset bimetallic element 62 by circulating through resistor 69, heater 61, armature 72, stationary contact 73 and back to source 20c. As mentioned herein, when the reset bimetallic element 62 is heated, it deflects to return microswitch 43 to its open position. Then, when microswitch 43 is opened, the current ceases to flow through coil 70 and armature 72 is no longer attracted thereby. Hence, no current flows through contacts 73 and 74 and tripping coil 77. When no current is in coil 77 the coil is rendered ineffective as a breaker opening means and the breaker 22 may be closed to energize the motor once again. This may now be done by closing switch 60.

If the motor 16 nears synchronous speed before the time that relay 40 cuts the motor off, it is brought under the influence of the field application relay 29 because the flux in coil 33 drops and the flux in coil 34 predominates to cause the armature 35 to close contacts 30. Upon closure of contacts 30 of relay 29, current flows from the source 20b through the closing coil 31, contacts 30 of relay 29, contacts 22d of breaker 22 and back to the source 20c. Energization of coil 31 closes the field contactor 28. When the field contactor 28 closes, the current that was flowing through the heater elements 41 and 51 is cut off because the contact 28d of field contactor 28 is opened. Also, the exciter is connected to the field winding 18 and energizes it to cause the rotor to pull into synchronism.

Motor 16 may also be stopped manually by closing push button 101 which causes current to flow from the source 20b through push button 101, trip coil 77 and contacts 22f of the breaker 22 and back to the source 20c. Upon the energization of trip coil 77, circuit breaker 22 is actuated to interrupt the current flow through the primary winding 17 of the motor 16.

Although but one embodiment of the present invention has been illustrated and described it will be apparent to those skilled in the art that various changes and modifications may be made therein without departing from the spirit of the invention or from the scope of the appended claims.

Having now particularly described and ascertained the nature of our said invention and the manner in which it is to be performed, we declare that what we claim is:

1. A relay comprising a switch, said switch having an open and a closed position, a thermally responsive tripping element, means connected to a source of current for heating said element, said element being positioned to engage said switch after being heated a predetermined time to trip said switch to said closed position, a thermally responsive reset element, means for heating said reset element, said reset element heating means being connected to receive current from said source when said switch is tripped, said reset element being positioned to return said switch to said open position after being heated for a predetermined time, said tripping element being free to return to its normal position while said reset element is being heated.

2. In combination: a circuit breaker connected to a power circuit and adapted to energize a synchronous motor, means for opening said breaker, a thermal device for controlling said opening means, electric circuits connecting said breaker to said device, said device comprising a switch having an open and a closed position, a thermally responsive tripping element and a thermally responsive reset element, said elements each having means for independently adjusting their lengths of deflection, and heaters disposed near each of said elements, means for closing said breaker to energize said motor, means for causing a tripping current to flow through said tripping elements' heater to heat said tripping element when said motor is energized, said tripping element being positioned to engage said switch after being heated for a predetermined time to trip said switch to said closed position, said switch cutting off said tripping current upon being moved to said closed position and causing said breaker opening means to open said breaker to deenergize said motor, said switch upon being closed causing a reset current to flow through said reset elements' to heater to heat said reset element, said reset element upon being heated a predetermined time moving said switch to said open position thereby rendering said opening means ineffective and cutting off said reset current.

References Cited in the file of this patent
UNITED STATES PATENTS

| | | |
|---|---|---|
| 2,629,034 | Harrold | Feb. 17, 1953 |
| 2,740,929 | Baude | Aug. 3, 1956 |